2 Sheets—Sheet 1.

D. C. SUMNER.

Cloth Finishing Machine.

No. 9,265. Reissued June 29, 1880.

Witnesses:
John C. Dunbridge.
Willy G. A. Schultz.

Inventor:
D. C. Sumner
by his attorney
A. V. Briesen

2 Sheets—Sheet 2.
D. C. SUMNER.
Cloth Finishing Machine.
No. 9,265. Reissued June 29, 1880.
Fig: 3.
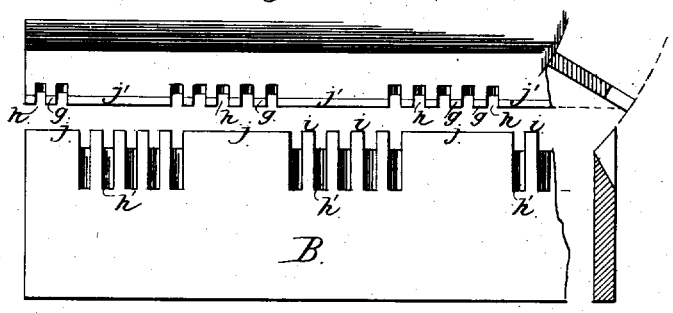
Fig: 4.
Fig: 5.
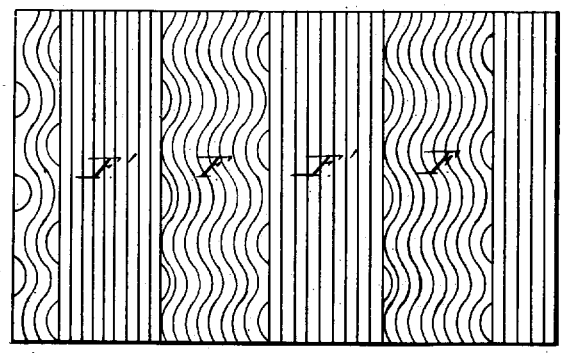
Witnesses:
John C. Tunbridge
Willy G. Co. Schultz
Inventor:
D. C. Sumner
by his attorney
A. v. Briesen

UNITED STATES PATENT OFFICE.

DWIGHT C. SUMNER, OF MILLBURY, MASSACHUSETTS.

CLOTH-FINISHING MACHINE.

SPECIFICATION forming part of Reissued Letters Patent No. 9,265, dated June 29, 1880.

Original No. 203,388, dated May 7, 1878. Application for reissue filed February 14, 1880.

DIVISION A.

*To all whom it may concern:*

Be it known that I, DWIGHT C. SUMNER, of Millbury, Worcester county, Massachusetts, have invented a new and Improved Machine for Finishing Cloth, of which the following is a specification.

This invention relates to certain improvements in machinery for finishing textile fabrics by shearing peculiar figured patterns out of the surface of such fabrics.

Previous to my invention it had been the custom to cut the pile or nap of the fabric to a uniform smooth surface by a suitable apparatus constructed for the purpose; and a further step in the art was to provide machinery that would cut or shear the pile or nap in grooves or furrows of a zigzag, curved, or circular form. These grooves or furrows were duplicates or counterparts of each other, having the same curve or general appearance throughout the entire surface of the fabric.

The object of my invention is to produce an entirely different effect in the ornamentation of the face of the fabric by producing a class of ornamentations comprising two distinct and dissimilar species of longitudinal stripes, alternating with each other and simultaneously formed.

The invention therefore consists in the machine for carrying out the said method, which is principally composed of a peculiarly notched or recessed ledger-blade, a cloth-rest, and a revolver or cylinder provided with radiating blades, notched or recessed at their edges in peculiar manner. The said ledger-blade and the revolver-blades are provided with cutting edges or sections constructed to operate in relation to each other, so as to form two distinct and dissimilar series of line ornamentations simultaneously in the pile or face fibers of the fabric, as will be hereinafter more fully described.

Figure 1:
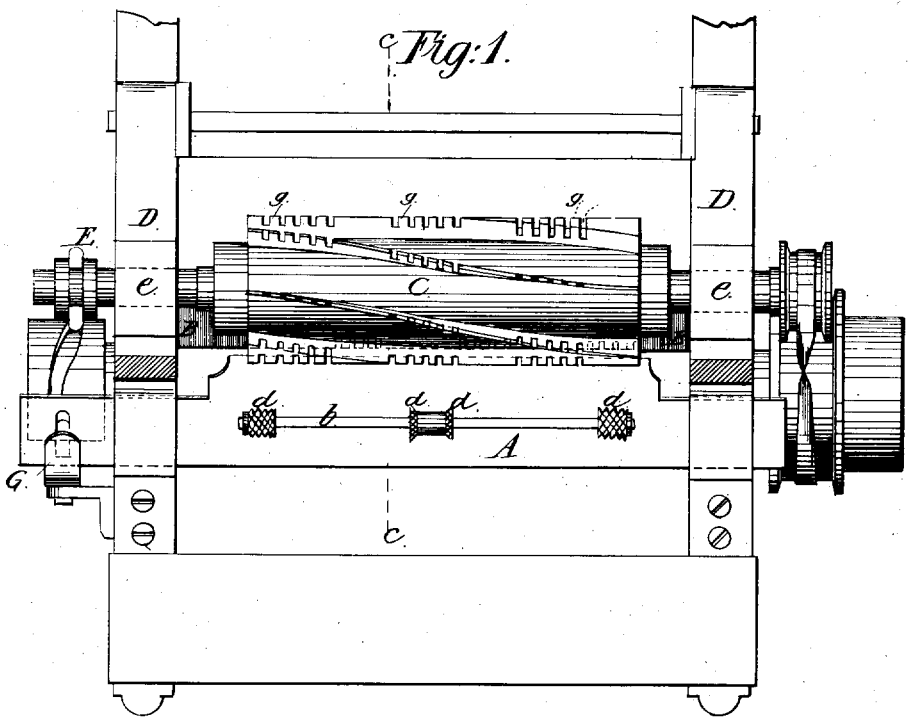
Figure 2:
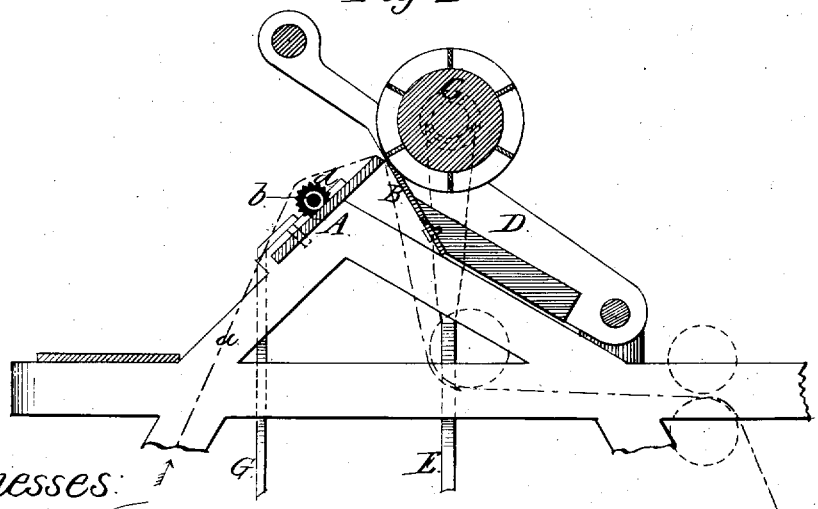

In the accompanying drawings, Figure 1 is a front elevation of such portions of a cloth-finishing machine as are necessary to illustrate my invention. Fig. 2 is a vertical cross-section of the same, taken on line *c c* of Fig. 1. Fig. 3 represents, on an enlarged scale, a portion of one of the revolver-blades and a cross-section thereof. Fig. 4 represents a similar view of a portion of the ledger-blade and a cross-section thereof, and Fig. 5 illustrates one style of pattern produced by means of my invention.

I do not here claim the fabric produced by my machine, as the same is made the subject of a separate division (B) of reissue of the Letters Patent of which this is also one division.

Referring to the drawings, A denotes the cloth support or rest, over which the fabric *a* is passed or drawn in the direction indicated by suitable feeding mechanism—such, for instance, as the rollers shown by dotted lines in the drawings. On top of the cloth-rest A is journaled horizontally and parallel to the cloth-rest a shaft, *b*, carrying burr or toothed rollers *d*, over which the cloth passes in going through the machine. These burr-rolls take hold of the cloth or other fabric and prevent it from moving laterally on the cloth-rest, so that when the machine is in operation and the cloth-rest reciprocates the cloth will be held firmly to said cloth-rest, (perfect liberty being allowed it to go forward,) so that the cutting-sections can operate upon its surface with the proper effect.

B represents the ledger-blade, firmly supported on the frame D, with its edge in position to receive the face fibers of the fabric as it passes over the edge of the rest A.

C indicates the revolver or shear blade cylinder, mounted to revolve in bearings *e* on the frame D, and arranged to have a longitudinal reciprocating movement independently of the ledger-blade B or its supporting-frame D, the said reciprocating movement being given to it by means of the cam-lever E or other suitable mechanism.

The revolver or blade cylinder C works against the edge of the ledger-blade B for the purpose of shearing the face fibers of the fabric as it passes over the cloth-rest, the relative positions of the revolver C, ledger-blade B, rest A, and fabric *a* (shown in dotted lines) being the same as in ordinary cloth-shearing machines.

The main supporting-frame, the devices for feeding forward the fabric, and the operating belts and gearing may be like the ordinary shearing mechanism, or of any suitable construction and arrangement, and need not, therefore, be herein more fully described.

The blades of the revolver C are provided with a series of cutting-sections, *g*, between which are notches *h*. (See Fig. 3.) The ledger-blade B is also provided with a series of notches, *h'*, and cutting-sections *i* along its working-edge.

The action of the recessed blades is to form ridges and furrows on the pile or raised face fibers of the fabric. In the present instance the blades are provided with long cutting-sections *j j'* and short cutting-sections *i* and *g*, the long sections on the revolver and ledger-blade alternating, as shown.

The long full cutting-sections *j* on the ledger-blade, acting with the short cutting-sections *g* of the revolver C, impart to the face of the fabric lines of ornamentation, F, corresponding to the notched portions of the revolver-blades, while the long full sections *j'* of the revolver C, acting with the short sections *i* of the ledger-blade B, impart to the fabric lines of ornamentation F' corresponding to the notches of the ledger-blade, thus giving two distinct sets or series of lines simultaneously produced, but independently of each other in their formation.

The ledger-blade, being fixed in its position on the frame D, produces a series of parallel stripes, running in the direction in which the fabric is fed or moved, which, with the rest A stationary, would be straight forward. The revolver C, being reciprocated longitudinally in its bearings *e* by means of the cam-lever E or other suitable mechanism, produces a series of undulating or zigzag lines, thus imparting to the surface of the fabric a figure or pattern of the peculiar nature indicated in Fig. 5, consisting of two distinct series of cut lines—viz., the parallel lines F' and the undulating or zigzag lines F—the two series of lines showing as stripes longitudinally of the piece, and forming a neat and complete finish over the face of the fabric. In this instance the vibratory movement of the revolver equals the width of one of the narrow sections or of the notches *h*.

For the above pattern the cloth-support A is retained in a fixed position; but said support or rest A may have an independent reciprocating movement by a cam-lever, G, or other suitable device, and the burr roll or rolls *d* will retain the fabric laterally and compel it to follow the motion of the rest while it is fed forward over the rest. By thus reciprocating the rest A the stationary notched ledger-blade B is caused to shear undulating or zigzag lines, while the lines produced by the reciprocating movement of the revolver-blades have an independent and different degree of undulation or zigzag form, thereby producing a variation of pattern on the fabric.

The pattern produced may be variously modified by the variation of the vibrating movement by vibrating the parts intermittingly or at different rates of speed; also, by changing the relative sizes and arrangement of the cutting-sections *g i* and notches *h' h* on the revolver and ledger blades, respectively.

All of the patterns produced by the above modifications are of the same nature or class, consisting of two independent series of longitudinal stripes, perfectly combined, and simultaneously produced by the peculiar double action of the ledger-blade and revolver.

It will be understood that in a full working machine the several parts of the mechanism should be provided with adjusting devices, so that the blades can be adjusted or set up to each other as they wear, and to accommodate the rest A to different thicknesses in the fabric, such adjusting devices being of any suitable construction.

I claim—

1. In a machine for shearing cloth, the combination of a ledger-blade and a revolver or blade-cylinder, both of which have a series of cutting edges or sections, arranged in relation to each other substantially as described, whereby their combined action will impart to the fabric or face thereof in a direction with its length two distinct and dissimilar series of stripes, alternating with each other, substantially as described.

2. In a machine for shearing cloth, the combination, with a revolving or blade cylinder provided with cutting-sections and a notched ledger-blade, of a cloth support or rest, substantially as described.

3. The combination of a revolver or blade cylinder having cutting-sections, of mechanism for reciprocating said cylinder, and of a notched ledger-blade, with a cloth support or rest, and with mechanism for reciprocating the cloth-support, substantially as described.

4. In a machine for shearing cloth, the combination of a blade-cylinder having notched blades with mechanism for reciprocating the same, and with a notched ledger-blade and a cloth-rest, substantially as described.

DWIGHT C. SUMNER.

Witnesses:

ISAAC D. GOULDING,
GEORGE W. PARSONS.